United States Patent [19]

Takasa et al.

[11] Patent Number: 4,946,930
[45] Date of Patent: * Aug. 7, 1990

[54] BIAXIALLY ORIENTED POLYOXYMETHYLENE FILM

[75] Inventors: Kenji Takasa, Yokosuka; Satoshi Iijima, Kamakura, both of Japan

[73] Assignee: Asahi Kasei Kogyo Kabushiki Kaisha, Osaka, Japan

[*] Notice: The portion of the term of this patent subsequent to May 30, 2006 has been disclaimed.

[21] Appl. No.: 221,602

[22] Filed: Jul. 20, 1988

[30] Foreign Application Priority Data

Jul. 21, 1987 [JP] Japan .................................. 62-179923
Jan. 25, 1988 [JP] Japan .................................. 63-12586

[51] Int. Cl.$^5$ .............................................. C08G 2/24
[52] U.S. Cl. .................................... 528/230; 528/246; 528/248; 528/250; 528/270; 525/472; 428/910; 264/210.7; 264/290.2
[58] Field of Search ................. 528/230, 246, 248, 250, 528/270; 525/472; 428/910; 264/210.7, 290.2

[56] References Cited

U.S. PATENT DOCUMENTS 4,835,245  5/1989  Takasa et al. ........................ 528/230

OTHER PUBLICATIONS

CA109(26):232481e, "Dimensionally Stable Biaxially Stretched Polyoxymethylene Films".
CA106(16):121079y, "Rigid Polyoxymethylene Films".
WPI Acc. No.: 89-134886/18, "Biaxially Stretched Polyoxymethylene Films Containing Mixtures of Polyoxymethylene Homo— and Co—polymers".
WPI Acc. No.: 89-025664/04, "Biaxially Oriented Polyoxymethylene Film".

Primary Examiner—John Kight, III
Assistant Examiner—S. A. Acquah
Attorney, Agent, or Firm—Birch, Stewart, Kolasch & Birch

[57] ABSTRACT

There is disclosed a biaxially oriented film formed of film forming composition comprising a polyoxymethylene polymer in which the major constituent of the main chains of said polymer each of consists substantially of repeating units of oxymethylene group $-(CH_2-O)-$, said film being characterized in that, when said film is remelted at a temperature above the melting point of said film and the resulting melt is recrystallized isothermally at 140° C. into a solid in film form, the number of polyoxymethylene spherulites in the crystal structure at the surface of the resulting film would be at least 50 per 0.1 mm$^2$ area of the resulting film surface, as measured with a polarizing microscope through cross-polarizers, and a process for manufacturing the same.

7 Claims, 3 Drawing Sheets

BIAXIALLY ORIENTED POLYOXYMETHYLENE FILM

BACKGROUND OF THE INVENTION

1. Field of the Invention

The present invention relates to biaxially oriented films formed of a film forming composition comprising a polyoxymethylene polymer in which the major constituent of the main chains of said polymer each consists substantially of repeating units of oxymethylene group $+CH_2-O+$. More particularly, the present invention relates to the above described biaxially oriented polyoxymethylene films excellent in surface smoothness.

2. Statement of the Related Art

It is generally known that polyoxymethylene has a very remarkable tendency to crystallize. While polyoxymethylene films are formed, for instance, by melt compression or melt extrusion followed by quenching, the films thus obtained are opaque or translucent and are additionally characterized with inferior mechanical properties. It is said that this is because crystallized polyoxymethylene forms highly-grown spherulites. Accordingly, attempts have been made to improve the clarity and mechanical properties of polyoxymethylene films by stretching these films biaxially.

Japanese Patent Application Kokai (Laid-Open) Nos. 252135/86, 286115/86, and 013318/87 (corresponding to Japanese Patent Application Nos. 92246/85, 127132/85, and 151349/85, respectively), filed previously by the present inventors, disclose that a highly biaxially oriented crystalline polyoxymethylene film has a high tensile elastic modulus and a superior dimensional stability, and further reveal techniques for the industrial production of such films, whereby the production of biaxially oriented polyoxymethylene films having excellent properties has become possible.

These biaxially oriented polyoxymethylene films are by far superior in strength, dimensional stability, clarity, etc. However, the surface smoothness of these films is not on a sufficient level as compared with those of other common polymer films, e.g. polyester films. The surface smoothness may be a very important factor depending upon the application of the film. For example, the improvement of magnetic tapes has rapidly advanced rapidly in recent years and this has been accompanied, in particular, by severe surface quality requirements for the base films. In order to achieve high performance in magnetic video recording, the tape function of electric energy-magnetic energy interconversion must be enhanced and for this reason the surface of the base film is required to be smoothed. To be suitable for magnetic recording applications, it is required to control the surface roughness of the base film to a center-line-average roughness Ra of $0.1\mu$ or less.

SUMMARY OF THE INVENTION

An object of the present invention is to provide biaxially oriented polyoxymethylene films which have excellent properties, particularly the property of superior surface smoothness, and hence are more suitable for practical use.

Another object of the invention is to provide a process for producing such films.

Upon cooling melted polyoxymethylene, rapid growth of spherulites is observed on account of the marked tendency of the polymer to crystallize. The rate of spherulite growth, spherulite sizes, and distribution thereof, in this case, depend on the temperature and rate of cooling, pressure in cooling, the molecular weight of the polymer, the type and amount of additive, etc.

Taking notice of this tendency to develop spherulites that is characteristic of polyoxymethylene, the present inventors prepared polyoxymethylene resins different in the tendency to develop spherulites and evaluated the surface states of films produced from these resins by biaxial stretching. As a result it has been discovered that the tendency to develop spherulites relates very intimately to the surface smoothness of the biaxially stretched film and the difference in surface smoothness appears as a difference in the tendency to develop spherulites. Further, this difference in the tendency to develop spherulites has been found to appear more remarkably and clearly, when the biaxially stretched film is remelted and the melt is recrystallized. That is, it has been found that, when two types of biaxially stretched polyoxymethylene films different in surface smoothness are remelted at a temperature above the melting point and upon recrystallizing the melts, spherulites resulting from the film superior in surface smoothness are much smaller in diameter than sperulites resulting from the film inferior in surface smoothness. Based on the above finding, the present invention has been accomplished.

DETAILED DESCRIPTION OF PREFERRED EMBODIMENTS

The present invention involves a biaxially oriented film formed of a film forming composition comprising polyoxymethylene polymer in which the major constituent of the main chains of said polymer each consists substantially of repeating units of oxymethylene group $+CH_2-O+$, said film being characterized in that, when said film is remelted at a temperature above the melting point of said film and the resulting melt is recrystallized isothermally at 140° C. into a solid film form, the number of polyoxymethylene spherulites in the crystal structure at the surface of the resulting film would be at least 50 per 0.1 $mm^2$ area of the resulting film surface, as measured with a polarizing microscope through cross-polarizers or cross-nicols.

The spherulite referred to in this specification is a solid structure found most typically and relatively easily in crystalline polymers. The spherulite is a rounded higher-order crystal structure grown in a specific arrangement from a crystal nucleus with the spherulite being situated at the center. This structure can be readily observed with a polarizing microscope through cross-polarizers. When a large number of spherulites grow, they collide with one another and form polyhedrons having distinct boundaries. Further when a larger number of spherulites develop, the boundary of each spherulite becomes obscure. Even in this case, however, it is possible to observe a so-called "Maltese cross"

cross-line which is one of the great characteristics of spherulites. Hence, individual spherulites can be identified by observing these cross-lines.

Figure 2:
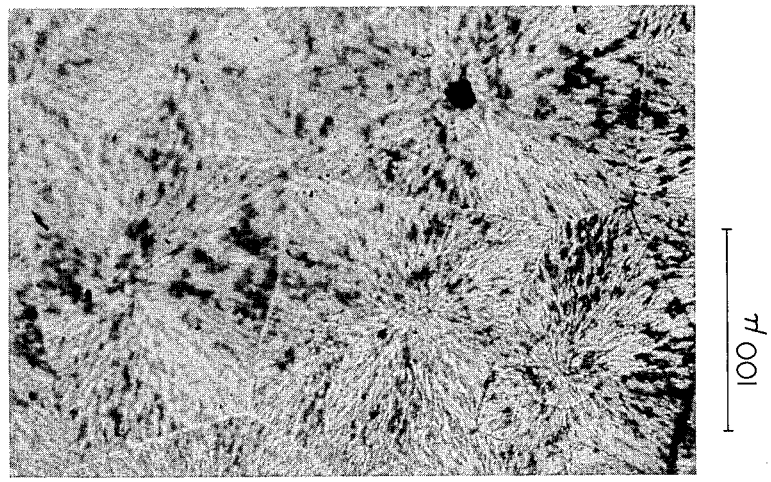
FIG. 2 is a photomicrograph showing crystals at a surface of the film resulting similarly from a film for comparison.
Figure 1:
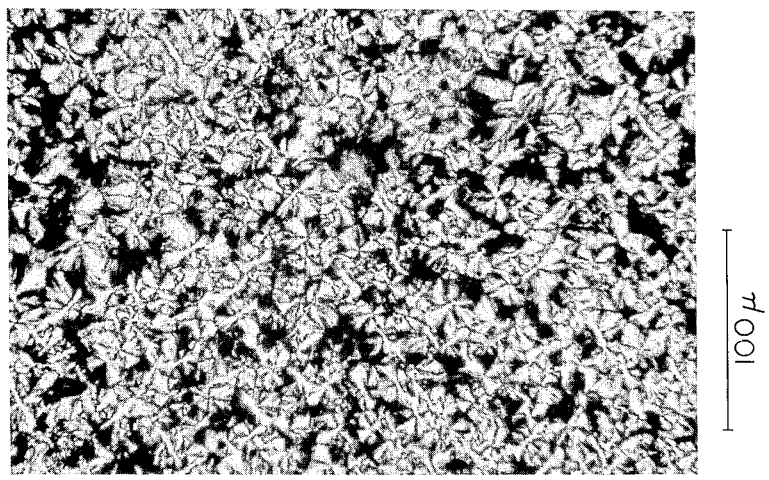
FIG. 1 is a photomicrograph showing crystals at a surface of the film of the present invention resulting from a film by remelting it and recrystallizing the melt.

On the film having superior surface smoothness as referred to in the present specification, it is difficult to determine the number of spherulites accurately by the above indentification. In this case, the number of spherulites per 0.1 mm² area, that is, the value being desirably determined for the present invention, can be evaluated with relatively high accuracy by counting first, the number of cross-lines in a small area of the surface, for example, an area of 0.01 mm² and multiplying the value by 10. FIGS. 1 and 2 show typical photomicrographs of the samples used to determine the number of spherulites by the above method. FIG. 1 is an example of the present inventive biaxially oriented polyoxymethylene film and FIG. 2 is an example of a conventional biaxially oriented polyoxymethylene film.

When the film of the present invention is remelted and recrystallized, such procedures are necessary in order to provide a solid having a flat film form of uniform thickness. However, this is difficult to obtain by simple remelting and recrystallizing the film, because the biaxially oriented film when heated to form a melt, would shrink and deform on account of the relaxation of orientation which occurs. Therefore it is recommended that the oriented film be held between two glass plates, these plates to be fixed so that any possible deformation of the film would not cause the space between the plates to change, and then be remelted and recrystallized. The use of thin glass plates is preferable for the purpose of preventing a change in the recrystallization conditions, due to the glass plates. Desirably, the thickness of each glass plate is 1 mm or less. The thickness of the film resulting from recrystallization is preferred to be minimized so as to facilitate the observation of spherulites. For example, the thickness is preferably from 5 to 30 $\mu$. The remelting may be carried out at a temperature above the melting point, preferably at 200° C., for a period of 30 seconds to 2 minutes. The recrystallization is requires to be conducted under definite conditions in order to maintain the conditions of spherulite growth constant. In the present invention, the recrystallization is conducted isothermally at 140° C. In this case, the remelted resin is quickly brought under the definite temperature condition of 140° C. before the crystallization proceeds, and the recrystallization is carried out under this condition.

The film having the larger number of spherulites as determined by the above method is improved in surface smoothness. The surface smoothness is quantified generally by measuring the surface roughness. The surface roughness, which can be expressed by various systems, is expressed in terms of the centerline-average roughness $Ra(\mu)$. The Ra is defined by the following equation:

$$Ra = \frac{1}{l} \int_0^l |f(x)| dx$$

and this value is calculated based on the equation by using samples taken according the JIS B-0601 (1976) method.

For instance, an Ra of up to 0.1 l and recently a further small Ra have been required of base films for magnetic tape purposes. The film of the present invention can sufficiently meet such requirements. That is, the surface of the film is of such superior smoothness so as to give an Ra of 0.001 to 0.1 $\mu$ depending on the surface preciseness of rollers used in the production thereof.

When a surface of superior smoothness is demanded as in such applications as mentioned above, the preferred numbers of spherulites in the film of the present invention are at least 100 per 0.1 mm² area.

Control of the tendency to develop polyoxymethylene spherulites is very important for the film of present invention. While this tendency depends on various factors as stated above, an easy and distinguished method for controlling the tendency is to add a small amount of a substance which will produce crystal nuclei (hereinafter such a substance is referred to as a nucleating agent), such a substance being generally well known.

An example of the above method comprises adding and dispersing 0.0001–0.5% by weight of talc of the in polyoxymethylene (British Pat. No. 1,133,490). Another example comprises adding a specific organic solvent, e.g. a hydroxy-containing imidazole or pyrazine derivative, which is completely or almost insoluble in the polyoxymethylene melt (British Pat. No. 1,193,708).

It is also publicly known that the crystal structure of polyoxymethylene, when its melt is cooled can be modified with a nucleating agent which is chemically stable at temperatures which are higher than the melting point temperature of polyoxymethylene crystal (U.S. Pat. No. 3,367,926).

Moreover, a polyoxymethylene is known to act as a nucleating agent on another polyoxymethylene (Japanese Patent Publication No. 19942/80). In this case, common linear polyoxymethylene produced by homo- or co-polymerizing formaldehyde or trioxane does not act as a nucleating agent on another polyoxymethylene of the same or different type. It is a branched or network polyoxymethylene which has the nucleating action (hereinafter, this type of polyoxymethylene is collectively referred to as branched polyoxymethylene). Techniques concerning a branched polyoxymethylene are disclosed in detail in Japanese Patent Publication Nos. 6277/69, 6278/69, 25114/70, 26507/70, and 42623/81, Japanese Patent Application Kokai No. 93717/84, etc.

As described above, methods for controlling the tendency of a polyoxymethylene to develop spherulites are well known and it is also well known that a polyoxymethylene can be constructed of smaller spherulites by these methods. However, it was quite unknown, until discovery by the present inventors, that a difference in the tendency to develop spherulites between polyoxymethylenes controlled and uncontrolled in said tendency, appears as a remarkable difference in surface smoothness between the respective films formed from the above polyoxymethylenes by biaxial stretching. That is, the excellent effect of the control of the tendency to develop spherulites has been first revealed on biaxially oriented films.

The polyoxymethylene film of the present invention is of a biaxially oriented type and is specified by the spherulite growth state of polyoxymethylene recrystallized from the re-melt of the oriented film. Accordingly, the method for controlling the tendency to develop spherulites in the production of the oriented film is not particularly limited to the above cited methods. In the production of the oriented film, it is important to minimize the effect of lowering the stretchability of the polyoxymethylene itself, the effect of deteriorating mechanical and thermal properties of the stretched film, and other adverse effects. For instance, an additive if inferior in dispersibility, though dependent on the type, will form agglomerates, which may cause a lowering of the stretchability or may remain as a foreign matter, resulting in deterioration of the film quality.

Nucleating agents are known to involve inorganic and organic types, of which organics are desirable for use in the present invention in view of the dispersibility. Moreover, the preferred nucleating agents have an affinity for polyoxymethylene melts and are relatively soluble therein.

There are various known organic nucleating agents including hydroxy-containing imidazole or pyrazine derivatives, e.g. 2,3-dihydroxyquinoxaline, 2,6-dihydrox-m-benzobisimidazole, 2,2'-dihydroxy-6,6'-bisbenzimidazole, 2-hydroxynaphthoimidazole, and 2,3-dihydroxybenzoquinoxaline. Accordingly, when these nucleating agents are used, it is necessary to pay attention to the amount thereof to add and to the method of mixing these agents in consideration of the affinity thereof for the polyoxymethylene melt and the solubility therein.

Besides the above cited nucleating agents, it is the branched polyoxymethylene, as illustrated above, which acts particularly effectively in the present invention.

Branched polyoxymethylene is constituted substantially of repeating units of the oxymethylene group $-(CH_2O)-$ and can be mixed uniformly in an optional ratio with other common polyoxymethylene, e.g. linear homo- or co-polymerized polyoxymethylene. In addition, the branched polyoxymethylene acts very effectively as a nucleating agent. Accordingly, this nucleating agent is less likely to act as a foreign matter, or as an agglomerate, nor will the agent ill disperse than other effective inorganic or organic nucleating agents. In the present invention, the amount of branched polyoxymethylene necessary to exhibit its effect is 0.01 part by weight based on 100 parts by weight of the linear polyoxymethylene. Thus, branched polyoxymethylene even in small amounts acts very effectively.

In addition, the present inventors have found that the admixing of the branched polyoxymethylene produces still another great effect. That is, it has been found that the stability of the stretched common linear polyoxymethylenes is greatly improved by incorporating branched polyoxymethylene thereinto.

For the purpose of producing an oriented film having superior mechanical and thermal properties, it is desirable to stretch the original sheet biaxially at higher stretch ratios. However, when sheets of an ordinary linear polyoxymethylene are stretched at particularly high stretch ratios, a breaking of the films frequently occurs. Thus, there has been a question of whether to improve the stability of the polymer by stretching. For achieving a higher stability by stretching, it is important in the first place, to control exactly and uniformly the stretching conditions, such as the stretch temperature and the stretch speed each controlled within an appropriate range. The stabilization up to a considerable level can be achieved by such control, but this level is still insufficient in view of the production of further highly oriented films or in view of the yield in the commercial production. Therefore, measures have been desired better control the stretching for stabilization.

The admixing of branched polyoxymethylenes result in the formation of spherulites having diameters of 5 to $10\mu$ or smaller, depending on the circumstances, caused by the nucleating action. Polyoxymethylene comprising such small spherulites has an increased number of spherulites joining one with another because of the small diameters of spherulites. Thus, the strength of spherulites being bonded together is enhanced and this increases the resistance to stretch stress. In addition, since the supherulites are small, the local concentration of the stretch stress is avoided, viz. the stress is dispersed. Moreover, since branched polyoxymethylene can be mixed with other ordinary polyoxymethylenes in any ratio and uniformly, all the spherulites are constructed of homogeneous crystals which are constituted substantially of repeating units of $-(CH_2-O)-$ as its major constituent. It is assumed that such effects of branched polyoxymethylene, when it is incorporated into the common linear polyoxymethylene, improves the stretchability thereof to a great extent. This stretchability-improving effect, as stated above, was first discovered by biaxial stretching of an original sheet of such composition.

When the linear polyoxymethylene consists of a homopolymer of formaldehyde, trioxane, or tetraoxane, the stretchability thereof, as stated above, is improved by adding branched polyoxymethylene. Moreover, the present inventors have found that the stretchability is further improved by adding a linear copolymer to the above mixture, that is, the addition of a linear copolymer constituted of trioxane and at least one monofunctional reacting compound which is copolymerizable with trioxane, e.g., ethylene oxide. The amount of linear polyoxymethylene copolymer to be added, in this case, is at least 0.1 part by weight to 100 parts by weight of the linear polyoxymethylene homopolymer. When the amount is less than 0.1 part by weight, the effect of the addition is small. There is no particular restriction on the upper limit of the amount since the copolymer and the homopolymer can be mixed together in an arbitrary ratio. However, for the purpose of avoiding the impairment of excellent mechanical and thermal properties of the homopolymer, the copolymer is added in an amount of up to 50 parts, preferably up to 30 parts, by weight.

Branched polyoxymethylene for use in the present invention is described below in more detail. This branched polymer can be produced by known methods described in the above cited patent specifications.

For instance, Japanese Patent Publication No. 19942/80 describes the following method for producing branched polyoxymethylene.

It can be produced by (1) copolymerizing trioxane with at least one polyfunctionally reacting compound copolymerizable with trioxane and, under certain circumstances, with at least one monofunctionally reacting compound copolymerizable with trioxane, or (2) subjecting a linear polyoxymethylene having functional groups on the side chains or on the main chain to branching reaction or to crosslinking reaction, or (3) copolymerizing trioxane with at least one monofunctionally reacting compound copolymerizable with trioxane and with a branched or crosslinked polyether, or reacting linear polyoxymethylene with a branched or crosslinked polyether.

Branched polyoxymethylene for use in the present invention is characterized by having an excellent action of producing crystal nuclei, that is, an excellent nucleating action. This effect of branched polyoxymethylene, as stated already, appears as a large number of spherulites which is measured by the above described method, when the biaxially stretched film is remelted and the melt is recrystallized. The larger the number of spherulites, the more the surface smoothness of the biaxially stretched film would be improved. Therefore, this type of branched polyoxymethylene is preferred as a nucleating agent for use in the present invention.

An example of branched polyoxymethylene used in the present invention is a copolymer of trioxane with at least one polyfunctionally reacting compound copolymerizable with trioxane or a copolymer of trioxane with at least polyfunctionally reacting compound copolymerizable with trioxane and with at least one monofunctionally reacting compound copolymerizable with trioxane. The polyfunctional compound is used in an amount of generally from 0.01 to 5%, preferably from 0.05 to 2%, by weight. The monofunctional compound is used in an amount of generally from 0.1 to 10%, preferably from 1 to 5%, by weight.

Preferred polyfunctional compounds for use herein are bifunctional compounds including; alkylglycidyl formals, e.g. methylglycidyl formal, ethylglycidyl formal, propylglycidyl formal, and butylglycidyl formal; polyglycol diglycidyl ethers, e.g. ethylene glycol diglycidyl ether and triethylene glycol diglycidyl ether; alkanediol diglycidyl ethers, e.g. butanediol diglycidyl ether; and bis(alkanetriol)-triformals, e.g. bis(1,2,5-pentanetriol)triformal and bis(1,2,6-hexanetriol)-triformal. Preferred monofunctional compounds are cyclic ethers such as ethylene oxide, propylene oxide, glycol formal, dioxalane. In particular, ethylene oxide is preferable.

Linear polyoxymethylene for use in the present invention, which can be produced by known methods, is a homopolymer of formaldehyde, trioxane, or tetraoxane or a copolymer of trioxane with at least one monofunctionally reacting compound, e.g. ethylene oxide, copolymerizable with trioxane. The content of the monofunctional compound in the copolymer is generally from 0.1 to 20% preferably from 1 to 5%, by weight.

For the purpose of exhibiting the effect on biaxial stretching in the present invention, branched polyoxymethylene is used in an amount of at least 0.01 part by weight based 100 parts by weight of the linear polyoxymethylene. If the amount of branched polyoxymethylene is less than 0.01 part by weight, its effect will be small. For exhibiting the effect to a greater extent, the amount is desirably at least 0.1 part, preferably at least 0.5 part, by weight. As the amount is increased, the effect generally increases and the surface smoothness of the resulting oriented film becomes improved. However, the effect of branched polyoxymethylene varies with its molecular weight, the number of branches in a molecule (branch density), and other factors. Depending upon the nature of branched polyoxymethylene, a minute amount thereof may act effective in the extreme. For example, branched polyoxymethylene having the lower melt index would act the more effectively.

In the present invention, there is no particular restriction on the maximum amount of branched polyoxymethylene that could be added. The amount of branched polyoxymethylene to be added is decided according to the effectiveness thereof and to mechanical and thermal properties thereof. For instance, when attaching importance to the surface smoothness in particular, it is possible to increase the proportion of branched polyoxymethylene to a great extent, e.g. to 50 parts by weight or more. On the other hand, when the linear polyoxymethylene is a homopolymer and its excellent mechanical and thermal properties are intended to be retained to the extent possible, it is desirable to control the proportion of branched polyoxymethylene to such a level so as not to bring about the deterioration of such properties. In this case, the upper limit of the proportion for the biaxially oriented film of the present invention is generally 30 parts, preferably 15 parts, by weight, though this is dependent upon the effectiveness of the branched polyoxymethylene used.

The biaxially oriented film of the present invention may contain another thermoplastic resin or elastomer as a third component in addition to a component such as branched polyoxymethylene having nucleating action. The third component is exemplified by the following polymers:

(1) Homo- or co-polymers of $\alpha$-olefin, e.g. polyethylene, ethylene/propylene copolymer, ethylene/acrylic ester copolymer, ethylene/methacrylic ester copolymer, and ethylene/acrylic acid copolymer;

(2) Homo- or co-polymers of 1,3-dienes, e.g. polybutadiene, polyisoprene, butadiene/styrene copolymer, and butadiene/acrylonitrile copolymer;

(3) Homo- or co-polymers of vinyl esters, e.g. poly(vinyl acetate), poly(vinyl propionate), and poly(vinyl butyrate);

(4) Homo- or co-polymers of acrylic esters or methacrylic esters, e.g. poly(ethyl acrylate), poly(butyl acrylate), poly(butyl methacrylate), poly(hexyl methacrylate), poly(2-ethylhexyl methacrylate), poly(octyl methacrylate);

(5) Polyethers, e.g. polyethylene glycol, polypropylene glycol, polytetramethylene glycol, and ethylene oxide/propylene oxide copolymer;

(6) Polyesters, e.g. polyethylene sebacate and polybutylene sebacate; and (7) Polyether/polyamide copolymers, e.g. polytetramethylene glycol/6-nylon copolymer.

In this case, the proportion of the third component is up to 10%, preferably up to 5%, by weight based on the total mixture. If necessary, additives such as heat stabilizers and antioxidants could also be added in addition to the above third component.

There is no particular restriction on the process for producing the biaxially oriented film of the present invention. The stretch ratio in either of the machine direction and transverse direction is at least 3:1, preferably at least 5:1. An preferred example of the process for producing biaxially oriented polyoxymethylene films is disclosed in Japanese Patent Application Nos. 127132/85 and 151349/85 (corresponding to Japanese Patent Application Kokai Nos. 286115/86 and 013318/87, respectively), which were filed by the present applicants. Details of this process are as follows:

A polyoxymethylene composition according to the present invention is melted, shaped, and solidified into a sheet or film (hereinafter this is referred to as an original film).

Then, the original film is stretched first (first-stage stretch) in one direction and second (second-stage stretch) in the direction perpendicular thereto while keeping the temperature of the sheet or film within the range of a temperature of from 30° C. lower to a temperature of 5° C. higher than the temperature of the original film composition at the peak of its crystal melting curve drawn by using a differential scanning calorimeter (hereinafter this temperature is referred to as the crystal melting point of original film measured with a differential scanning calorimeter). That is, this process comprises subjecting the sheet or film stretched in the first stage to the second-stage stretch in the direction perpendicular to the first-stage stretch direction while keeping the temperature of the sheet or film within the above defined range.

When the temperature of the sheet or film is lower than the lower limit of the above defined range, the orientation-crystallization due to the first-stage stretch proceeds rapidly and in the second-stage stretch the stretch stress increases rapidly. This lower limit temperature presumably relates intimately to the crystal growth temperature of polyoxymethylene. As the film temperature decreases and approaches the lower limit, the rate of crystallization increases and below the lower limit this rate is very high and the control of process is substantially infeasible. Accordingly, it is preferred, for the purpose of achieving more-stable process control and stable second-stage stretch, that the lower limit of said retention temperature (the temperature at which the film is to be kept) be 20° C. lower than the crystal melting point of original sheet measured with a differential scanning calorimeter.

When the temperature of the sheet or film is higher than the upper limit of the above defined range, the fusion of crystals is dominant and the orientation effect in the first-stage stretch decreases and depending on circumstances the film may fuse to break. Therefore, the upper limit of stretch temperature is preferably controlled to said crystal melting point of original film measured with a differential scanning calorimeter.

In the ordinary stretch process, the first-stage stretch and the second-stage stretch are carried out continuously and hence setting of the retention temperature near the stretch temperature is advantageous in view of production efficiency as well as in view of equipment simplicity.

The retention time at the above defined retention temperature is preferably reduced as far as possible for the purpose of retarding the crystallization. More specifically, the retention time is from 0.1 to 600 seconds depending upon the retention temperature.

In this case, the stretch temperature in the first and second stages is kept within the range of desirably from a temperature of 25° C. lower to a temperature of 5° C. higher than said crystal melting point temperature of original film measured with a differential scanning calorimeter, preferably at temperature of from 15° C. lower temperature to said crystal melting point.

The stretch temperature in the first stage and that in the second stage are not necessary the same. These stretch temperatures are chosen properly, within the above defined range, according to the stretchability and other stretch conditions.

Preferably, the original film, prior to the first-stage stretch, is rolled in the machine direction to give a percentage decrease $\gamma$ in film thickness satisfying the condition $$1.2 \leq \frac{1}{1-\gamma} \leq 5$$

$$\gamma = 1 - \frac{t}{t_o}$$

wherein, $t_o$ is the original-film thickness before rolling and $t$ is the original-film thickness after rolling. Then, the rolled film is subjected to the first-stage stretch in the transverse direction at a stretch ratio of the least 5:1 and then to the second-stage stretch in the machine direction at a stretch ratio of at least $5(1-\gamma):1$.

The temperature of film or sheet in rolling is in the range of desirably from room temperature to 30° C. lower than said crystal melting point of original film measured with a differential scanning calorimeter, preferably from room temperature to 50° C. lower than said crystal melting point. Although higher temperatures of film or sheet in rolling are preferred in view of the efficiency of rolling, the stretchability in the subsequent stretch process tends to lower when this temperature exceeds a temperature of 30° C. lower than said crystal melting point.

The original film may be preheated prior to the rolling. Moreover, the intended rolling-down ratio $$(= \frac{1}{1-\gamma}$$

in which $\gamma$ is percentage decrease may be achieved not only by one rolling operation but also by operating in parts.

Figure 4:
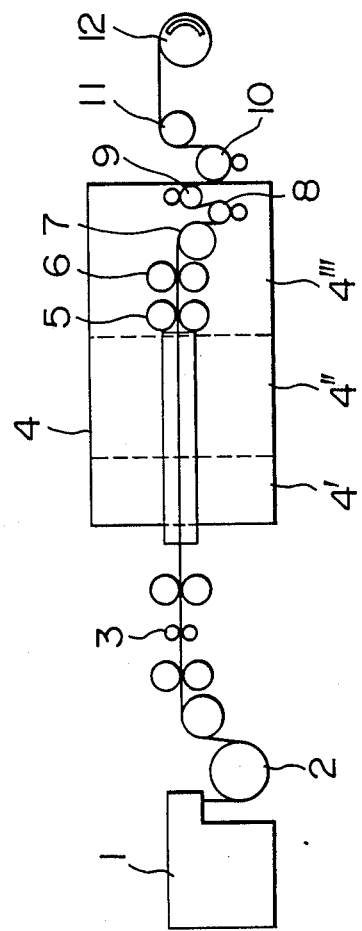
FIG. 4 is a schematic view of a machine for processing the present film.

In the next place an example of the process for producing biaxially-oriented polyoxymethylene films according to the present invention is illustrated with reference to FIG. 4.

Polyoxymethylene from an extruder 1 is cooled with cooling roller 2 to form an original film. This film is led to roller 3 and rolled therewith. The rolled film is then led to transverse stretcher 4. The transverse stretch is carried out usually with a tenter. The film is preheated in section 4' up to the intended stretch temperature and stretched transversally in section 4''. Section 4''' is a temperature-maintaining zone for the first-stage stretch and the second-stage stretch. Pinch rollers 5 and 6 installed in this zone are for the purpose of fixing the film after transverse stretch. Between these rollers, film slitting at the edge portions can also be carried out. The slitting at the edge portions can also be carried out after the next machine stretch has been finished. Machine-directional stretch of the film having thick edge portions can inhibit the transverse shrinkage due to neck-in of the film, hence being effective in the present process.

Subsequently, the film is preheated over a roll 7 to the intended temperature of the second-stage stretch and then stretched by means of stretching rollers 8 and 9 in the machine direction. Revolutions of stretching rollers 8 and 9 are set at $V_1$ and $V_2$, respectively. This revolution ratio $V_2/V_1$ determines the stretch ratio for the machine-directional stretch. While FIG. 4 shows single-step, machine-directional stretch performed by operating the stretching rollers 8 and 9, multistage stretch can also be carried out, if necessary, by using more rollers. Multistage, machine-directional stretch, as compared with single-stage, machine-directional stretch at the same stretch ratio, permits lowering the speed of stretch as well as distributing stretch stress among the stages. The film stretched in the machine direction is cooled over cooling rollers 10 and 11 and then wound up around a winding shaft 12. While not shown in FIG. 4, the stretched film is subjected to heat treatment, if necessary, to improve the dimensional stability to heat and other properties. Further, the film after the finish of the above stretch treatments, is stretched in the machine direction and/or in the transverse direction as occasion demands, whereby the product film can be more improved in mechanical and thermal properties. In this case, it is possible to apply either of the consecutive biaxial stretch method, in which machine-directional stretch and transverse stretch are carried out separately, and the simultaneous biaxial stretch method, in which operations of stretch in both the directions are carried out at the same time. In the consecutive method, one-directional stretch tends to result in a film improved in some mechanical and other properties in that direction but deteriorated in those properties in the direction perpendicular to the above on account of the relaxation of orientation. To avoid this phenomenon and improve properties in both the directions, the simultaneous biaxial stretch method is preferred for the film of the present invention.

The present invention is illustrated in more detail with reference to the following examples. However, these examples are not to restrict the scope of the invention.

EXAMPLE 1

A branched polyoxymethylene copolymer is prepared which is constituted of 97.5 wt. % of trioxane, 2.0 wt. % of ethylene oxide, and 0.5 wt. % of 1,4-butanediol diglycidyl ether. To 100 parts by weight of a linear polyoxymethylene homopolymer (supplied by Asahi Kasei Kogyo Co., Ltd. under the tradename of TENAC ® grade 3010) is added and mixed 1.5 parts by weight of the above branched polyoxymethylene. The mixture is homogenized through a screw extruder at 200° C. and then pelletized.

These pellets are melted and extruded through a slit due to 200° C. and the extrudate was quenched over a casting roller heated at 130° C. to form a film (original film) 800μ thick and 150 mm wide.

Then a biaxially oriented film is obtained by stretching the original film biaxially in the following manner: The original film is first preheated to 100° C. and then rolled and kept at a temperature of 100° C. to roll at a rolling-down ratio of 2.5 in the machine direction. The rolled film is led to a tenter, i.e. a transverse stretcher, and further to a machine-directional roller stretcher, thereby being stretched in the transverse direction and further in the machine direction. The stretching temperature in this case is 170°–173° C. for both the transverse stretch and the machine-directional stretch. The transverse stretch is conducted at a stretch speed of 200%/min and a stretch ratio of 8:1. The transition from the transverse stretch to the machine-directional stretch is conducted contiguously while maintaining the film temperature at the same level (170°–173° C.) without being dropped. The machine-directional stretch is carried out at a stretch ratio of 3.5:1 between a roller driven at a lower rotating speed of 1 m/min and a roller driven at a higher rotating speed of 3.5 m/min. The biaxially oriented film obtained is in a machine-directional stretch ratio of 9:1 and transverse stretch ratio of 6:1, based on the original film. The thickness of this product film is 15μ. The surface roughness of this film is 0.042μ in terms of the centerline-average roughness Ra.

In the next place, this film is put between two 0.5-mm thick glass plates. After these plates have been fixed so that the space therebetween would not vary, the film is melted by heating at 200° C. for 30 seconds. Then the glass plates are quickly removed, placed into a silicone oil bath and kept at a constant temperature of 140° C. to recrystalline the melt. Spherulites at the surface of the recrystalized polymer film are observed with a polarizing microscope through cross-polarizers. The result showed that the surface is constructed of small spherulites of 15–30μ sizes and the number of spherulites is from 150 to 300 per 0.1 mm² surface area. FIG. 1 shows an photomicrograph of a surface of the recrystallized polymer film.

The surface roughness is measured with a meter, Model 554-A, supplied by Tokyo Seimitsu Co., Ltd. under the conditions: contact needle diameter 1 μR, contact needle pressure 0.7 mN (0.07 g), cutoff value 0.25 mm, measurement length 1.25 mm, and scanning speed 0.03 mm/sec.

EXAMPLE 2

A branched polyoxymethylene is prepared which is constituted of 97.9 wt. % of trioxane, 2.0 wt. % of ethylene oxide, and 0.1 wt. % of 1,4-butanediol diglycidyl ether.

Varying amounts as shown in Table 1 of the above branched polyoxymethylene are admixed each with 100 parts by weight of the same linear polyoxymethylene as used in Example 1.

Each of mixtures obtained is homogeneized similarly to Example 1 and then formed into an original film 800μ thick and 150 mm wide. Each original film is biaxially stretched according to the procedure of Example 1, yielding a biaxially oriented film. Proper stretch temperatures in this case varied somewhat with the content of branched polyoxymethylene. Hence, the stretch temperature optimum for each composition is chosen within the range of 165° to 175° C. Each biaxially oriented film obtained is in a machine-directional stretch ratio of 9:1 and a transverse stretch ratio of 6:1, based on the original film. The thickness of each product film is 15 μ. The result of measuring the surface roughness of each film is as shown in Table 1 in terms of the centerline-average roughness Ra.

In the same manner as in Example 1, each film obtained is melted by heating at 200° C. for 30 seconds and the melt is recrystallized at 140° C. Spherulites at the recrystallized film surface are observed with a polarizing microscope through cross-polarizers, and the number of spherulites per 0.1 mm² area is calculated. Results of the calculation on the product films are also shown in Table 1.

Figure 3:
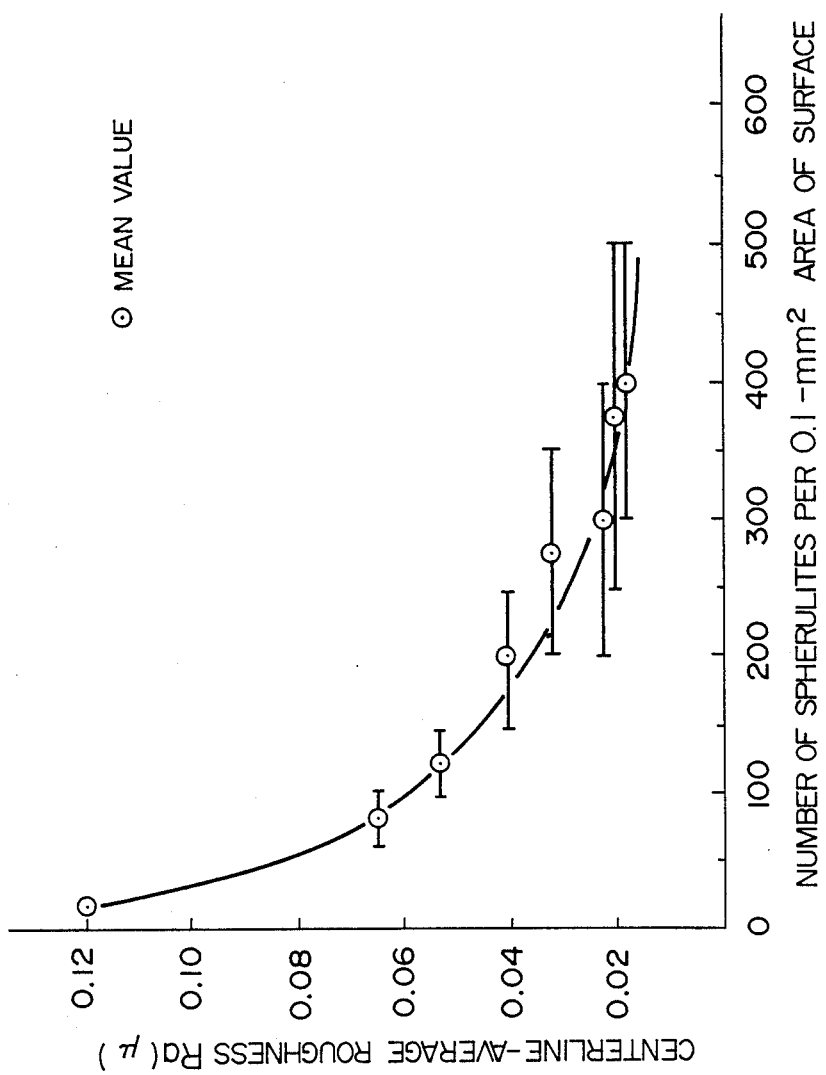
FIG. 3 is a graph showing the relation of the surface roughness to the number of spherulites.

For comparison, similar measurements are made on a biaxially oriented film which contained no branched polyoxymethylene and is composed essentially of the same linear polyoxymethylene used in this example. Results of the measurements are also shown in Table 1. Further, FIG. 2 shows a photomicrograph of a surface of the film resulting from the remelting of this oriented film and the recrystallization of the melt. Comparing FIG. 2 with FIG. 1, it can been seen that a great difference in the size of spherulite is present therebetween. Further, FIG. 3 shows the relation of the centerline-average roughness to the number of spherulites per 0.1 mm² area, with the results being shown in Table 1. It can be seen from FIG. 3 that the surface smoothness becomes improved as the number of spherulites increases.

The foregoing results demonstrate that the film of the present invention is excellent in surface smoothness.

TABLE 1

| Amount (part by wt.) of branched POM*[1] added to 100 parts by wt. of linear POM | Centerline-average Roughness Ra ($\mu$) | Number of spherulites per 0.1-mm$^2$ area |
| --- | --- | --- |
| 0 | 0.12 | 8–15 |
| 0.01 | 0.064 | 60–100 |
| 0.5 | 0.053 | 100–150 |
| 3 | 0.040 | 150–250 |
| 5 | 0.032 | 200–350 |
| 10 | 0.022 | 200–400 |
| 20 | 0.022 | 200–450 |
| 30 | 0.020 | 250–500 |
| 50 | 0.018 | 300–500 |

*[1]POM: Polyoxymethylene

EXAMPLE 3

To individual samples of the same polyoxymethylene as used in Example 1 are respectively added and mixed 1, 3, 5, 10, and 30 wt. % of a commercial polyoxymethylene (supplied by Polyplastics Co., Ltd. under the tradename of Duracon grade U-10), which are known to have superior nucleating action. According to the procedure of Example 1, each mixture is homogenized, pelletized, and formed into a film, which is then stretched biaxially, yielding a biaxially oriented film. Table 2 shows the results of measuring the centerline-average roughness Ra of each of the oriented films and the number of spherulites per 0.1 mm$^2$ area of each of the film surfaces resulting from the remelting of each oriented film and the recrystallization of the melt.

TABLE 2

| Amount of commercial POM*[1] added (wt. %) | Centerline-average roughness Ra ($\mu$) | Number of spherulites per 0.1-mm$^2$ area |
| --- | --- | --- |
| 1 | 0.045 | 150–250 |
| 3 | 0.038 | 150–300 |
| 5 | 0.033 | 150–300 |
| 10 | 0.030 | 200–400 |
| 30 | 0.028 | 250–500 |

*[1]POM: Polyoxymethylene, this ROM has nucleating action.

EXAMPLE 4

Using only a commercial polyoxymethylene having nucleating action (the same polymer as used in Example 3), a biaxially oriented film is produced according to the procedure of Example 1. The surface roughness Ra of this film is 0.012$\mu$ and the film surface resulting from the remelting of the oriented film and the recrystallization of the melt is formed of very small spherulites, that is, 500 or more spherulites are found per 0.1 mm$^2$ area of the recrystallized film surface.

EXAMPLE 5

Original films 800$\mu$ thick containing severally 0, 0.01, 5, and 20 parts by weight of branched polyoxymethylene which are prepared in Example 2 are each rolled at a rolling-down ratio of 2.5 in the machine direction. Each of the rolled films is led to a transverse stretching tenter and then to a machine-directional roller stretcher, thereby being stretched biaxially. The stretch ratio in this case is set at 10:1 in the transverse direction and at 4.5:1 in the machine direction. Each of biaxially oriented films obtained is in a machine-directional stretch ratio of 11:1 and a transverse stretch ratio of 9:1. The stretch of each original film is continued for 30 minutes at a winding speed of 5 m/min.

Table 3 shows the result of evaluating the stretching stability of the original film of each composition and the result of measuring the machine-directional tensile elastic modulus of each biaxially oriented film obtained. As to the stretching stability rating, mark means that the film could be stretched without break during 30 minutes' continuous operation, mark $\Delta$ means that the stable stretch could be continuous for a period of 15 to 30 minutes, mark X means that the stable stretch could not be continued for 15 minutes. These results indicated that the film of the present invention is superior in stretchability and stretching stability and retains excellent mechanical properties of the homopolymer without virtual deterioration of these properties and in certain cases is provided further with superior properties.

TABLE 3

| Amount (part by wt.) branched POM*[1] added to 100 parts by wt. of linear ROM | Evaluation of stretching stability | Tensile eleastic modulus (kg/mm$^2$) |
| --- | --- | --- |
| 0 | X | 760 |
| 0.01 | $\Delta$ | 760 |
| 5 | O | 780 |
| 20 | O | 740 |

*[1]POM: Polyoxymethylene

EXAMPLE 6

In the same manner as in Example 5, biaxial stretch is carried out to compare the stretching stabilities of films which has been prepared from the following two different compositions:

(a) A mixture of 100 parts by weight of the same linear polyoxymethylene homopolymer as used in Example 1 and 0.5 part by weight of the same branched polyoxymethylene as used in Example 2.

(b) Mixture (a)+3 parts by weight of a linear polyoxymethylene copolymer (supplied by Asahi Kasei Kogyo Co., Ltd. under the tradename of TENAC® grade C-3510).

The results showed that the film from composition (a) free of the copolymer frequently broke during 20–60 minutes of operation though the stability varied, while the film from composition (b) containing said copolymer could be stretched over 1 hour or more without being broken.

The machine-directional tensile elastic moduli of two types of films obtained are each 770 kg/cm$^2$. No difference in this property is found between the two. These results indicate that compounding a small amount of linear polyoxymethylene copolymer with a mixture of linear polyoxymethylene homopolymer and branched polyoxymethylene improves further the stretchability and stretching stability without impairing the excellent mechanical properties of the homopolymer.

The biaxially oriented polyoxymethylene film of the present invention has been improved in surface smoothness to a great extent without impairing the excellent mechanical and thermal properties of polyoxymethylene. In addition, the present film can be produced with much improved stretching stability. The present inventive film can be used for various applications taking advantage of such characteristics as stated above, for example, base films for magnetic recording media, such as magnetic tapes and floppy disks, and ribbon cassette films for thermal transfer-copying. Thus the industrial significance of the present invention is very great.

What is claimed is:

1. A biaxially oriented film formed of a film forming composition comprising a polyoxymethylene polymer in which the major constituent of the main chains of said polymer each consists substantially of repeating units of oxymethylene group $-(CH_2-O)-$, said film being characterized in that, when said film is remelted at a temperature above the melting point of said film and the resulting melt is recrystallized isothermally at 140° C. into a solid film form, the number of polyoxymethylene spherulites at the surface of the resulting film would be at least 50 per 0.1 mm$^2$ area of the resulting film surface, as measured with a polarizing microscope through cross-polarizers.

2. The biaxially oriented polyoxymethylene film of claim 1, wherein the film forming composition comprises a mixture of the linear form of the polyoxymethylene polymer and a branched polyoxymethylene polymer, in which the amount of the branched polyoxymethylene is at least 0.01 part by weight based on 100 parts by weight of the linear polyoxymethylene polymer.

3. The biaxially oriented polyoxymethylene film of claim 2, wherein the linear polyoxymethylene polymer is a a mixture of a homopolymer and copolymer thereof and the amount of the copolymer is at least 0.1 part by weight based on 100 parts by weight of the homopolymer.

4. The biaxially oriented polyoxymethylene film of claim 2, wherein the branched polyoxymethylene is a copolymer constituted of trioxane and at least one polyfunctionally reacting compound copolymerizable with trioxane or a copolymer constituted of trioxane, at least one polyfunctionally reacting compound copolymerizable with trioxane and at least one monofunctionally reacting compound copolymerizable with trioxane.

5. The biaxially oriented polyoxymethylene film of claim 2, wherein the branched polyoxymethylene is a copolymer constituted of trioxane, a cyclic ether, and a bifunctional reacting compound.

6. A base film for magnetic recording media comprising the biaxially oriented polyoxymethylene film of claim 1.

7. A base film for magnetic recording media comprising the biaxially oriented polyoxymethylene film of claim 2.

* * * * *